United States Patent [19]

Brown et al.

[11] 4,206,837

[45] Jun. 10, 1980

[54] CENTRIFUGAL CLUTCH HAVING ELECTROMAGNETIC RELEASE

[75] Inventors: Henry M. Brown, Leicester; Richard L. Mitchell, Wellesley, both of Mass.

[73] Assignee: Dana Corporation, Toledo, Ohio

[21] Appl. No.: 882,575

[22] Filed: Mar. 2, 1978

[51] Int. Cl.² .................................................. F16D 43/18
[52] U.S. Cl. ...................................... 192/90; 192/103 B; 192/105 CD
[58] Field of Search ............. 192/84 T, 90, 83, 103 B, 192/105 CD, 105 BA, 76

[56] References Cited

U.S. PATENT DOCUMENTS

| | | | |
|---|---|---|---|
| 1,782,513 | 11/1930 | Roos | 230/270 |
| 2,275,046 | 3/1942 | Harris | 192/103 B |
| 2,303,361 | 12/1942 | Hibbard | 192/84 T |
| 2,400,586 | 5/1946 | Zimmermann | 192/105 A |
| 2,606,638 | 8/1952 | Russell | 192/84 R |
| 2,729,318 | 1/1956 | Harter | 192/84 R |
| 2,808,917 | 10/1957 | Harter | 192/84 R |
| 2,875,875 | 3/1959 | Prahauser et al. | 192/84 R |
| 3,361,238 | 1/1968 | Yokel | 192/84 R |
| 3,491,866 | 1/1970 | Birdsall | 192/84 T |
| 3,762,516 | 10/1973 | Matsushita | 192/84 C |
| 3,902,581 | 9/1975 | Knudsen | 192/84 A |
| 3,978,953 | 9/1976 | Miller | 192/84 C |
| 4,010,832 | 3/1977 | Puro | 192/84 |
| 4,033,438 | 7/1977 | Wiltsey | 192/84 A |

Primary Examiner—Leslie Braun
Assistant Examiner—David C. Reichard
Attorney, Agent, or Firm—Wilson, Fraser, Barker & Clemens

[57] ABSTRACT

A centrifugal clutch is disclosed characterized by the use of an electromagnet to disengage a driven output load from a driving input member. In the clutch assembly, a rotatable output load is disposed about a rotatable drive shaft that carries centrifugal-responsive friction shoes. The shoes contain a magnetic pole an under centrifugal force move radially outwardly during rotation of the shaft to engage frictionally the output load for common rotation. A stationary electromagnetic coil disposed between the shaft and friction shoes attracts the shoes upon energization away from the output load to interrupt the frictional drive connection.

9 Claims, 3 Drawing Figures

CENTRIFUGAL CLUTCH HAVING ELECTROMAGNETIC RELEASE

BACKGROUND OF THE INVENTION

1. Field of the Invention

Clutches are commonly used in various mechanical applications where it is desired optionally to connect or disconnect a rotating input member with a rotatable output load. One type of clutch utilized centrifugal force generated by rotation of the input member to move frictional members radially outwardly and into engagement with the output load, thereby to achieve a frictional connection between the two parts.

This invention relates to a centrifugal clutch and, more particularly, to electromagnetic means for interrupting a frictional driving connection between an input driving member and an output driven member at any time it is desired, regardless of speed of rotation of the clutched parts.

2. Description of the Prior Art

Various structures have been previously employed in clutch assemblies to effect a driving connection between an input member, usually a drive shaft, and an output member or load. U.S. Pat. No. 1,782,513 to Roos describes a centrifugal clutch in which the input member carries weighted pivot arms. Normally, coil springs urge the arms into contact with an output member, but at a predetermined rate of rotation of the input member, centrifugal force throws the weighted ends of the arms outwardly to interrupt the two frictionally joined parts.

U.S. Pat. No. 2,400,586 to Zimmermann describes a mercury actuated centrifugal clutch in which radially moveable members are forced into driving engagement with a driven member by the pressure of mercury contained in an expansible driving member chamber. This action occurs atuomatically upon rotation of the driving member.

The clutches of the two foregoing patents lack the advantages of electro-actuation or electro-deactuation of a driving frictional connection and are subject to still other shortcomings. As an example, making or breaking a driving connection between input and output members depends wholly upon the speed of rotation a certain member, usually the driving member. Further, as the springs of the Roos patent weaken, the desired moment of declutching is unavoidably varied. In the mercury-actuated clutch of the type described in the Zimmermann patent, difficulties arise in introducing the mercury into suitable container as well as sealing the container and preventing it from subsequent rupture, especially under the inertia and fluid pressure developed by the relatively heavy mercury under centrifugal force.

An electromagnetic clutch is disclosed by U.S. Pat. No. 2,606,638 to Russell which, however, is not of the centrifugal type. The magnetic circuit of this clutch includes a pair of radially disposed discs which are placed in parallel, close proximity. One disc is fixed to an input member, and the other disc is fixed to the output member. The flux of the electromagnetic circuit locks the two discs together. In this case, therefore, the electromagnetic circuit is used to effect the actual coupling of the two parts rather than their disconnection. Also, since this type of clutch is not of the centrifugal type, it has no components responsive to centrifugal force.

SUMMARY OF THE INVENTION

The principal object of the present invention is to provide an improved centrifugal clutch in which electromagnetic means disconnects the driving and driven components. More particularly, the present clutch couples a rotatable input member to a rotatable output member by centrifugal force only, that is, in the absence of other electrical or hydraulically-actuated assits, and then disengages the indicated parts at any speed and any load value desired by electromagnetic power. Thus, centrifugal force moves a friction member outwardly to generate the friction forces for torque transmission, while an electromagnetic structure built into the clutch assembly retracts the frictional member upon energization to break the driving connection.

In one form, the clutch assembly includes rotatable input and output members, the latter being circumferentially disposed about the former. The input member carries friction means mounted for radial movement toward and away from the output member. The friction means has a magnetic pole and, in response to rotation of the input member, moves radially outwardly and frictionally contacts the output member to unite the two in joint rotation. An electromagnetic coil that is stationery with respect to the two rotatable members is stationed between the input member and its friction means to attract the friction means magnetically toward the coil when it is energized and thereby interrupt the joint rotation of the input and output members.

DESCRIPTION OF THE PREFERRED EMBODIMENT

A presently preferred embodiment includes a driving member having an input, rotatable shaft provided with a plurality of friction shoes mounted circumferentially about the shaft. Each shoe has a magnetic pole and is adapted for radial movement away from the shaft in response to its rotation. An electromagnetic coil disposed between the shoes and the rotatable shaft is held against rotation with the shaft. A driven output member disposed circumferentially about the driving member and its friction shoes is mounted on the same rotatable shaft of the input member but is free to rotate relatively to the shaft. In this position, the output member frictionally contacts the friction shoes upon their radial outward movement to unite the input and output members in common rotation. Upon energization, the coil attracts the friction shoes toward the coil and out of a friction-engaging union with the driven output member. A more detailed description of the clutch assembly follows with reference to the figures.

Driving Member

A driving member generally represented at 10 includes an input, rotatable shaft 11, a pair of friction shoes 12, a coil-retaining ring 13 that is held against rotation with shaft 11 and shoes 12 and disposed between them, and an electromagnetic coil 14 within ring 13.

Figure 2:
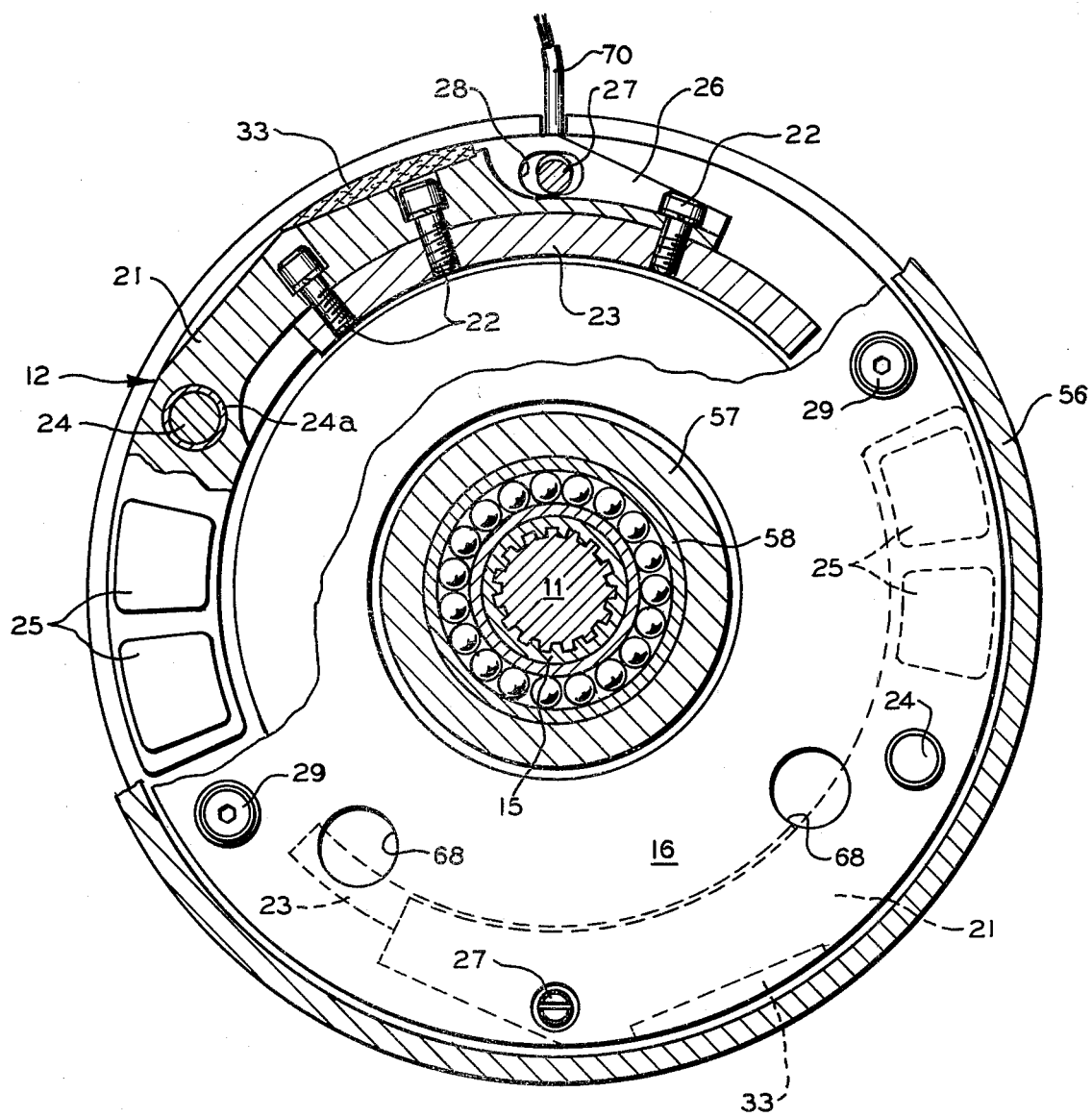
FIG. 2 is a section of FIG. 1 on the plane of the line 2—2 with the driven drum member removed, and with parts broken away to illustrate a friction shoe.

More particularly, shaft 11 has a sleeve 15, conventionally fixed to a splined end of the shaft. The sleeve has various stepped annular portions to receive or support other components of the driving member. A radially extending plate 16 tightly seats against a shoulder 17 on sleeve 15 and with companion plate 18 jointly support friction shoes 12 for pivotal motion. The shoes may be fabricated from light-weight metal such as aluminum. Plate 18 has a relatively large central opening 20 to pass easily shaft 11 and coil-retaining ring 13. Bolts 29 secure plates 16 and 18 together. Each shoe 12 has the same construction and consists of a longitudinally-extending, curved backing strip 21 (FIG. 2) to which bolts 22 secure a longitudinally-extending, curved magnetic pole 23 which may be of any conventional magnetic material such as iron oxide, ferrites, and the like. The curvature of pole 23 matches that of backing strip 21.

A pivot pin 24 fixed at its ends to plates 16 and 18 passes through each backing strip 21 and is journalled for rotation therewith in a bearing sleeve 24a. Counterweights 25 tend to urge shoe 12 counterclockwise around pin 24 as viewed in the upper portion of FIG. 2. The end of strip 21 opposite to that having the counterweights is bifurcated, each leg 26 straddling an eccentric pin 27 and having an oversize eccentric opening 28 through which pin 27 passes. Pin 27 has a central, enlarged lobe 30 and with opening 28 permits limited radial movement of shoe 12 with respect to shaft 11 and circular movement about pin 24 as an axis. Plates 16 and 18 also support the eccentric pins 27 in split bushings 31. There is a gap 32 at all times between shoes 12 and coil-retaining ring 13, regardless of the positions of the shoes. Intermediate its ends, each shoe 12 has a conventional brake, frictional facing 33 riveted or otherwise secured to an outer surface of the shoe.

Shaft 11 and its fixed sleeve 15 also support means to hold ring 13 and its coil 14 against rotation with shaft 11 and thereby also against rotation with friction shoes 12. A conventional roller bearing generally indicated at 34 is butted against shoulder 35 of sleeve 15 and is also held against lateral displacement by a snap ring 36 which seats in a circumferential groove in coil-retaining ring 13. A retaining ring 37 press fits against another shoulder 38 of sleeve 15 and bears against the lower race of bearing 34, while a sealing ring 40 bears against snap ring 36. A spring 41 compresses an elastomeric tail 42 of sealing ring 40. A locking ring 39 threaded on sleeve 15 buts against retaining ring 37 and is used to tighten the parts in assembly as illustrated.

Coil-retaining ring 13 is of general U-shape in cross-section with an open slot 42 outwardly directed toward poles 23 of friction shoes 12. One leg 13a of ring 13 can be separately formed to aid assembly of the clutch. The bight portion 13b of U-shaped ring 13 seats on the outer race of roller bearing 34 and has a threaded opening 43 used to receive a tool to assemble or dissassemble the ring in the clutch assembly.

Figure 1:
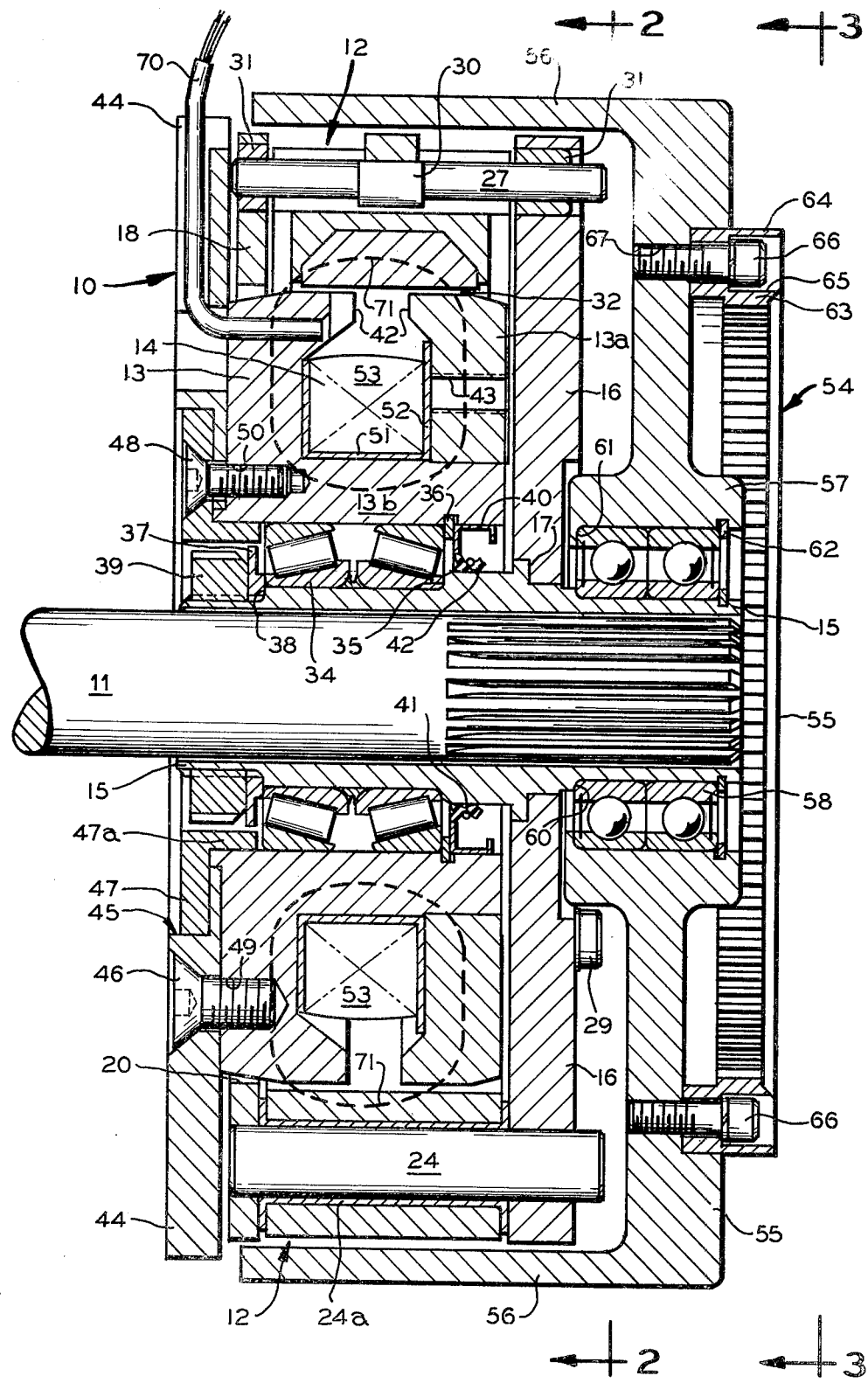
FIG. 1 is an offset radial section of the present clutch assembly taken on the line 1—1 of FIG. 3.

Positive hold means are used to keep coil-retaining ring 13 from rotating. In the illustrated embodiment, a mounting plate 44, which can be conventionally fixed to any rigid supporting structure (not shown) such as the end of the motor, has a relative large central opening 45 to pass shaft 11 and locking ring 39 and buts against the left-hand side of coil-retaining ring 13 as viewed in FIG. 1. Screws 46 pass through suitable openings in end plate 44 and engage threaded openings 49 in coil-retaining ring 13 to hold the plate and ring together. A circular plate 47 fits tightly into central opening 45 of end plate 44 and has a flange 47a which seats under the inner annular surface of ring 13. Screws 48 pass through openings in plate 47 and engage threaded openings 50 in coil-retaining ring 13 to hold these parts together. A relatively thin metal sheet 52 lines the three sides of slot 42 defined by ring 13, and a conventional electromagnetic coil 53, which can be encapsulated, thus within slot 42.

Driven Member

Figure 3:
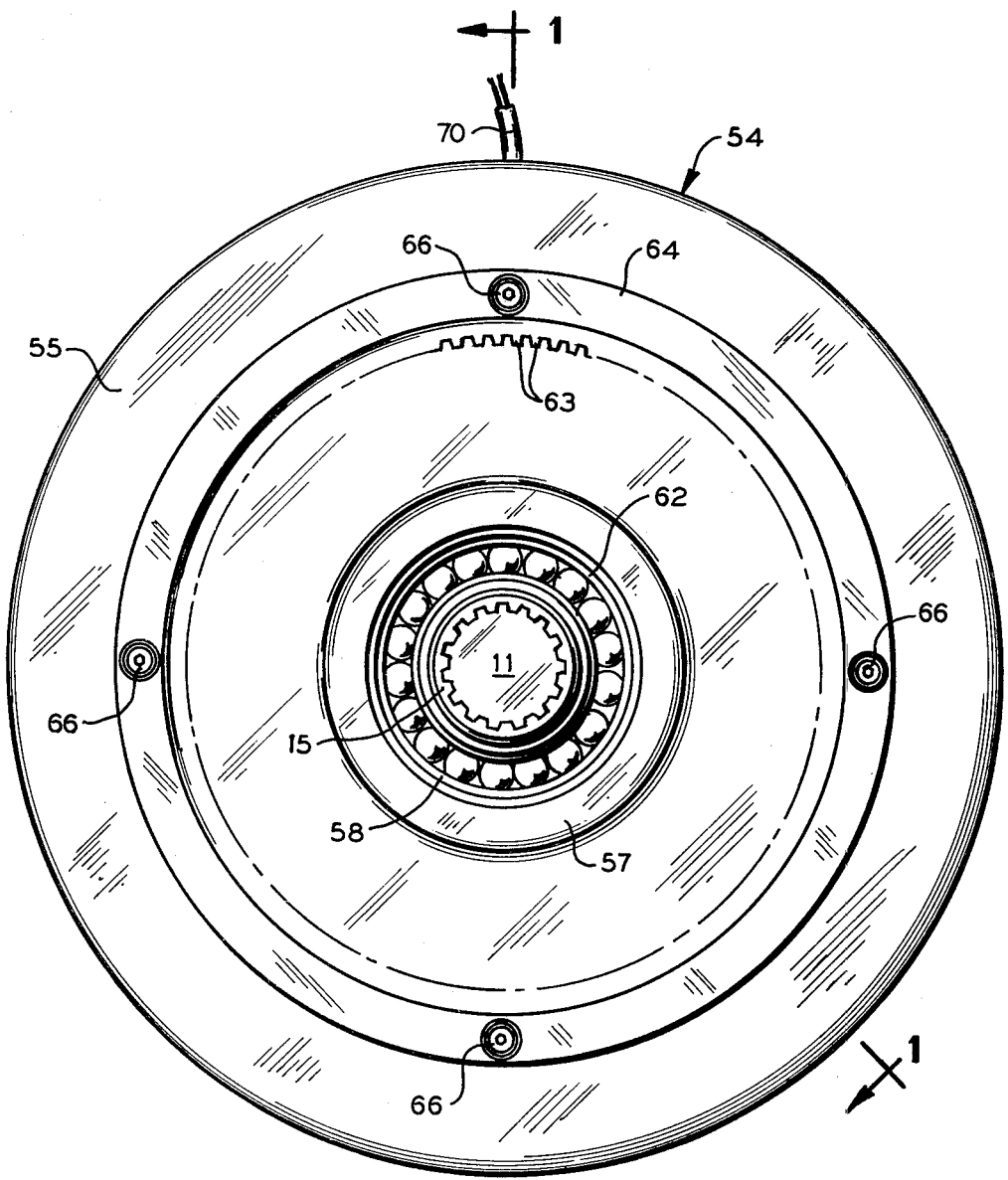
FIG. 3 is a section of FIG. 1 on the plane of the line 3—3.

The driven member generally represented at 54 (FIGS. 1 and 3) includes a drum 55 having a flange 56 which extends axially over and around friction shoes 12 so as to be cirumferentiall disposed thereabout. Shaft 11 supports drum 55, but since a driving connection is to be made between shoes 12 and flange 56, drum 55 is mounted on the shaft for free rotation therewith. Drum 55 has a hub 57 which rides about shaft 11 on a conventional ball bearing represented at 58. The inner race seats against a shoulder 60 on sleeve 15, while the outer race seats against a shoulder 61 formed in hub 57. A snap ring 62 seated in an annular groove within the bore of hub 57 prevents lateral movement to the left of the driven member as viewed in FIG. 1.

The torque transmission to the driven member can, in turn, be further transmitted by any known means. In the embodiment illustrated, a splined ring 63 is fixed to the exposed side of drum 55 for such torque transmission. Ring 63 has a peripheral rim 64 provided with openings 65. Bolts 66 pass through these openings and engage threaded openings 67 in drum 55. The drum may have holes 68 drilled therein to reduce its weight.

Operation

In operation, shaft 11 is rotated by any standard prime mover, such as an electric motor. With coil 13 de-energized, centrifugal forces generated by rotation of shaft 11 move frictional shoes 12 radially outwardly so that friction facing 33 engages the underside of flange 56, resulting in frictional and radial forces being applied to drum 55. This unites shaft 11 and drum 55 in common rotation and transmits torque to spline ring 63. During this time, coil 13 is stationary with respect to shaft 11, held in place by mounting flange 44 over roller bearing 34.

When it is desired to break the driving connection between the described input and output members, electromagnetic coil is energized through electrical conduit 70, and the resulting current produces magnetic flux. The flux travels a magnetic circuit illustrated by the dotted lines 71 in FIG. 1 and attracts poles 23 on friction shoes 12 toward coil 13, thereby disengaging the input and output members and, more particularly, shaft 11 from drum 55.

It will be appreciated that various changes in the illustrated embodiment are possible without departing from the inventive concept. Although the foregoing describes a presently preferred embodiment, it is understood that the invention may be practiced in still other forms within the scope of the following claims.

We claim:

1. A clutch assembly including a rotatable input shaft, a rotatable output member circumferentially disposed about said input shaft, friction means mounted on said input shaft for radial movement toward and away from said output member, said output member including a drum member having an axially-extending flange circumferentially disposed about said friction means, roller means mounted radially outward of said rotatable shaft between said drum member and said shaft for accommodating relative rotary movement therebetween, said friction means having a magnetic pole and adapted in response to rotation of said input shaft to move radially outwardly thereof and frictionally contact said output member thereby to unite said shaft and output member in joint rotation, and an electromagnetic coil stationary with respect to said shaft adapted upon energization to attract said friction means magnetically inwardly and thereby interrupt said joint rotation.

2. The clutch assembly of claim 1 including a radially-extending plate fixed to the rotatable shaft, and said friction means is mounted with respect to said plate for said limited radial movement.

3. The clutch assembly of claim 2 in which said electromagnetic coil is stationed between said friction means and said rotatable shaft, and including roller means between said coil and shaft for accommodating relative rotary movement therebetween.

4. The clutch assembly of claim 1 in which said friction means includes a plurality of longitudinally-extending shoes pivotally mounted intermediate their ends with respect to said input member and stationed circumferentially about said shaft, said shoes having friction material to contact said output member.

5. The clutch assembly in claim 1 which includes a coil-retaining ring disposed about said rotatable shaft having an open slot directed toward the magnetic pole of said friction means, said electromagnetic coil being disposed within said ring, means for holding said coil-retaining ring stationary with respect to said rotatable shaft, and bearing means for accommodating relative rotation between said coil-retaining ring and said rotatable shaft.

6. A centrifugal clutch assembly including:
 a. a driving member comprising an input, rotatable shaft, a plurality of longitudinally-extending friction shoes mounted circumferentially about said shaft, each shoe having a magnetic pole and being adapted for outward radial movement away from said shaft in response to its rotation a coil-retaining ring having an open slot directed toward the magnetic pole of said shoes and disposed between said shoes and the rotatable shaft, an electromagnetic coil carried within said ring, means for holding said coil-retaining ring stationary with respect to said rotatable shaft, and roller means for accommodating relative rotary movement between said coil-retaining ring and said rotatable shaft; and
 b. a driven output member adapted to be frictionally coupled to said driving member comprising a drum mounted on said shaft for free relative rotation therewith by roller disposed circumferentially outside said shaft, said drum having an axially-extending flange disposed over said friction shoes and adapted to make frictional contact therewith upon their outward radial movement.

7. The centrifugal clutch assembly of claim 6 in which ssaid rotatable shaft has a radially-extending plate, and said friction shoes are mounted laterally of said plate and circumferentially about said shaft.

8. The centrifugal clutch assembly of claim 7 in which said friction shoes are pivotally mounted intermediate their ends on said plate.

9. The centrifugal clutch assembly of claim 6 including bearing means between said rotatable shaft and said output member to provide said free relative rotation.

* * * * *